United States Patent [19]

Keller

[11] Patent Number: 4,944,546
[45] Date of Patent: Jul. 31, 1990

[54] FOLDABLE TRUCK RAMP

[76] Inventor: William K. Keller, P.O. Box 881595, Steamboat Plaza, Colo. 80488

[21] Appl. No.: 404,883

[22] Filed: Sep. 8, 1989

[51] Int. Cl.$^5$ .......................... B60P 1/43; B65G 69/28
[52] U.S. Cl. ...................................... 296/61; 414/537; 108/130
[58] Field of Search .................. 296/61; 414/537, 538; 108/123, 130, 131

[56] References Cited

U.S. PATENT DOCUMENTS

| | | | |
|---|---|---|---|
| 963,918 | 7/1910 | Miller | 414/537 X |
| 2,611,466 | 9/1952 | Biggert et al. | 414/537 X |
| 2,776,063 | 1/1957 | Larson | 296/61 X |
| 3,642,156 | 2/1972 | Stenson | 296/61 X |
| 3,976,209 | 8/1976 | Burton | 296/61 X |
| 4,034,716 | 7/1977 | Fleming | 296/61 X |
| 4,068,770 | 1/1978 | Boehringer | 414/537 |
| 4,088,235 | 5/1978 | Thacker | 414/537 |
| 4,878,800 | 11/1989 | Dell | 414/537 X |

FOREIGN PATENT DOCUMENTS 307313  8/1918  Fed. Rep. of Germany ...... 414/537

Primary Examiner—Margaret A. Focarino
Assistant Examiner—Joseph D. Pape
Attorney, Agent, or Firm—Richard C. Litman

[57] ABSTRACT

A three-section folding ramp that can also serve as an endgate for a truck bed. The ramp has mechanically folding and unfolding legs, so that the user doesn't have to pull the legs open one by one. A special latch allows all three sections to be held together while the folded ramp is being used as an endgate. A special channel allows the folded up ramp to rest when in the open endgate position without damaging the vehicle body.

7 Claims, 3 Drawing Sheets

FOLDABLE TRUCK RAMP

BACKGROUND OF THE INVENTION

1. Field of the Invention

The present invention is related to portable ramps for loading and unloading vehicles. More particularly it relates to a three-piece folding ramp that acts as a normal loading end gate for a truck bed in addition to its function as a ramp. The ramp is an integral part of the truck bed walls.

2. Description of the Prior Art

There are numerous prior patents related to various types of unloading ramps for trucks and other vehicles. None of these prior patents are believed to disclose, either singly or in combination, the applicant's unique invention.

The U.S. Pat. No. 963,918 issued to Elizabeth J. Miller discloses a multi-sectional folding ramp. The sections have manually extnedible legs. The ramp hooks over the edge of the container wall. This ramp is unlike the applicant's ramp in that it is not an integral part of a vechicle. It also lacks the mechanical leg opening means disclosed by the present invention.

U.S. Pat. No. 1,639,879 issued to L. C. Buffington discloses a ramp for livestock that folds into an endgate. This device acts only as a ramp and does not act as a conventional endgate, as in just folding down in one section.

U.S. Pat. No. 3,352,440 issued to M. Wilson discloses a two-section ramp that folds. It uses the original factory endgate on the vehicle instead of replacing it. It lacks the mechanically opening legs of the present invention.

U.S. Pat. No. 3,642,156 issued to Stenson discloses a ramp that attaches to the original endgate. Again, it only serves as a ramp and not as an endgate in addition.

U.S. Pat. No. 4,735,454 issued to Bernard discloses a two-section ramp. The device rests against the bumper of a vehicle when it serves as an endgate, causing damage to the vehicle body.

U.S. Pat. No. 4,795,304 issued to Dudley discloses a ramp that attaches to a bumper. It is not an integral part of the truck bed wall.

None of the previously discussed prior art patents disclose an integral three-section ramp that can also act as an endgate to a truck. The present invention's special mechanically opened legs were also not disclosed in the prior art.

SUMMARY OF THE INVENTION

The present invention comprises a three-section truck ramp that also functions as an endgate to the truck bed. The present invention completely replaces the factory-provided endgate of a truck. A special channel installed beneath the ramp device allows the whole device to rest, and acts as a standard endgate. This prevents damage to the bumper of the vehicle. Special spring clips hold all three sections together when it is desired to use the folded ramp as an endgate only. Removing the spring clips allows the ramp to unfold.

The ramp has special mechanically unfolding legs that come open to rest upon the ground when the ramp is unfolding. Heavy springs serve to bias the legs into an open position. A system of cables serves to pull against the legs, upon folding of the first and second sections, folding the legs inwardly so that they rest in-between the first and second sections.

Accordingly, it is one object of the present invention to provide a folding ramp that can serve as an endgate for a truck bed.

It is another object of the present invention to provide a folding ramp having legs that automatically extend and retract upon unfolding and folding of the ramp.

It is a further object of the present invention to provide a folding ramp having a spring latch to hold the multiple sections together when the ramp is being used as an endgate.

It is a still further object of the present invention to provide a folding ramp having a cable and spring system which serves to extend and retract the legs of the folding ramp.

It is yet another object of the present invention to provide a folding ramp that is compact and stores up against a truck bed.

These and other objects of the present invention will become readily apparent upon further review of the attached specification and drawings.

A BRIEF DESCRIPTION OF THE DRAWINGS

Similar reference characters denote corresponding features throughout the drawings.

A DETAILED DESCRIPTION OF THE PREFERRED EMBODIMENT

Figure 1:
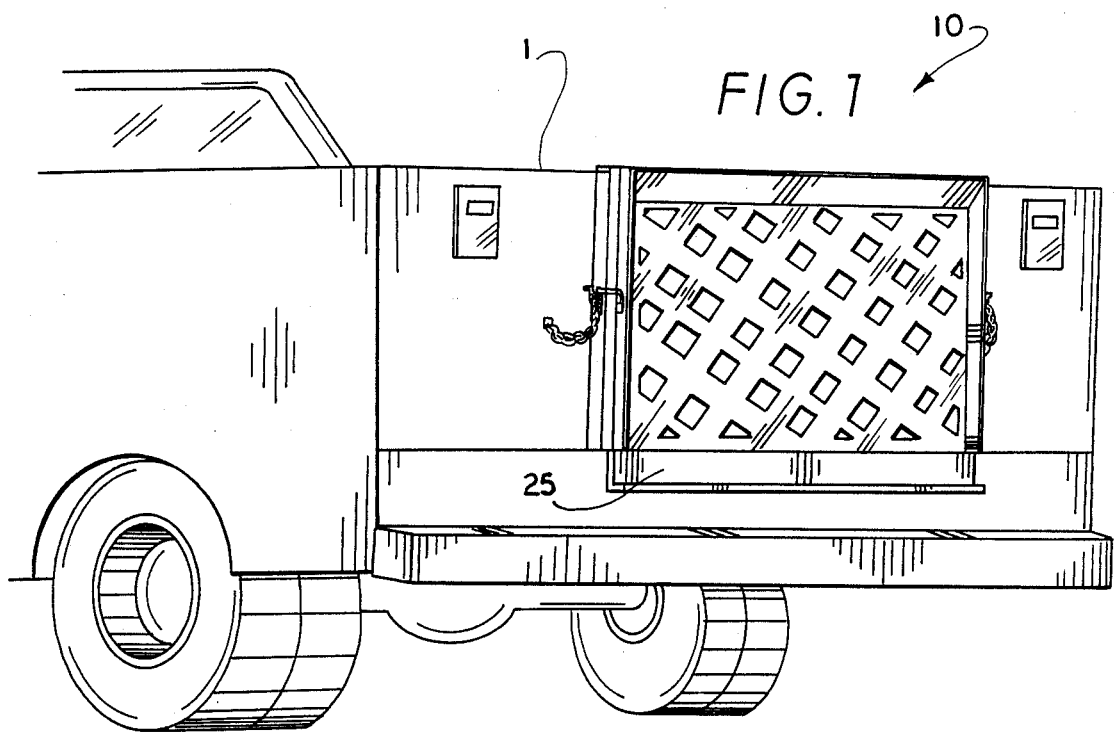
FIG. 1 is a perspective view of the rear end of a truck bed showing the folding ramp in the stored position.
Figure 2:
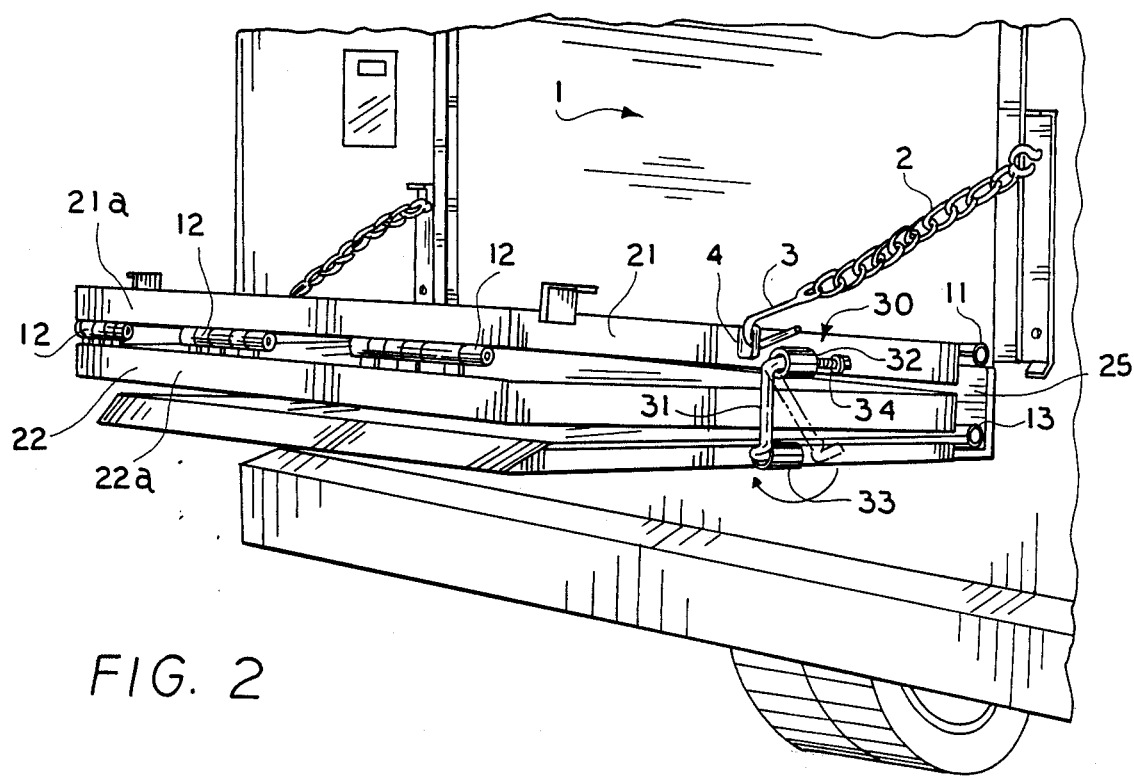
FIG. 2 is a perspective view showing the folding ramp in the open endgate position.

A back end view of a truck bed 1 shown in FIG. 1 depicts the folding ramp 10 in the closed endgate position. It acts just as a normal closed endgate would. FIG. 2 shows the folding ramp 10 in the open endgate position. The ramp 10 is pivotably connected by hinges 11 to the truck bed 1. Hinges 12 pivotably connecting the first plate 21 and second plate 22 are also shown. Likewise shown is the latch 30 which keeps all three plates 21, 22, 23, folded together when the ramp 10 is being used as an endgate only. A chain 2 can be used to hold the open ramp/endgate 10. The hook 3 and eye 4 could serve to secure the endgate/ramp 10 against high stress when a large object is seated on the ramp/endgate 10. In most cases though the binding of the ramp/endgate 10 in the channel 25 is sufficient support.

Figure 3:
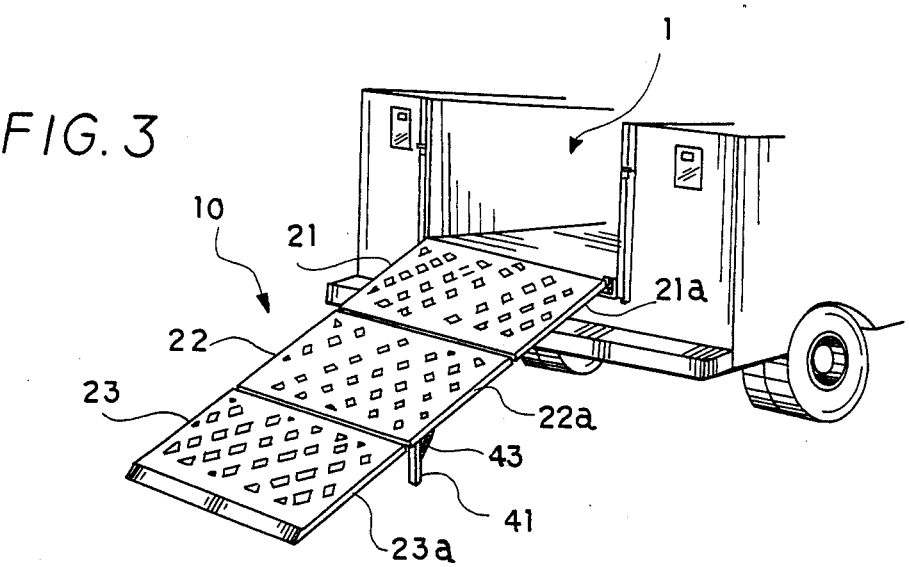
FIG. 3 is a perspective view of the folding ramp in the fully extended position.

The alternate mode of use for the ramp 10 is shown in FIG. 3. The ramp 10 is shown in the fully extended position with plates 21, 22, 23 lying even. The plates 21, 22, 23 are connected by hinges 12 and 13. Legs 41, 42 serve to support the ramp upon the ground. Plates 21, 22, 23 would be made from sheet metal, metal decking or expanded metal strong enough to support a small vehicle such as an ATV or a motorcycle that can be driven in or out of the truck bed 1. On the underside of each plate 21, 22, 23 is a low flange or wall 21a, 22a, 23a that completely encircles the periphery of each plate 21, 22, 23. The flanges 21a, 22a, 23a serve to limit the pivoting of the plates by having the flanges abut one another when the ramp 10 is fully extended.

A special channel 25 is shown in FIG. 1. This channel 25 serves to limit the lower extension of the ramp 10 when it is being used as an endgate. It also serves to protect the body of the truck 1 which would be damaged if the weight of the entire ramp 10 rested against it. Channel 25 should be formed of high strength material such as steel.

In FIG. 2 a view is shown of the latch 30 used to hold the plates 21, 22, 23 folded together when the ramp 10 is being used as an endgate only. The latch 30 consists of a formed bolt 31 that is U-shaped that fits through the tubes 32, 33. A spring 34 and washer bias the bolt 31 against the tubes 32, 33. Pressing-in the belt 31 and spring 34 extends the bolt 31 to open or close the latch. A latch 30 is on both sides of the ramp 10.

Figure 4:
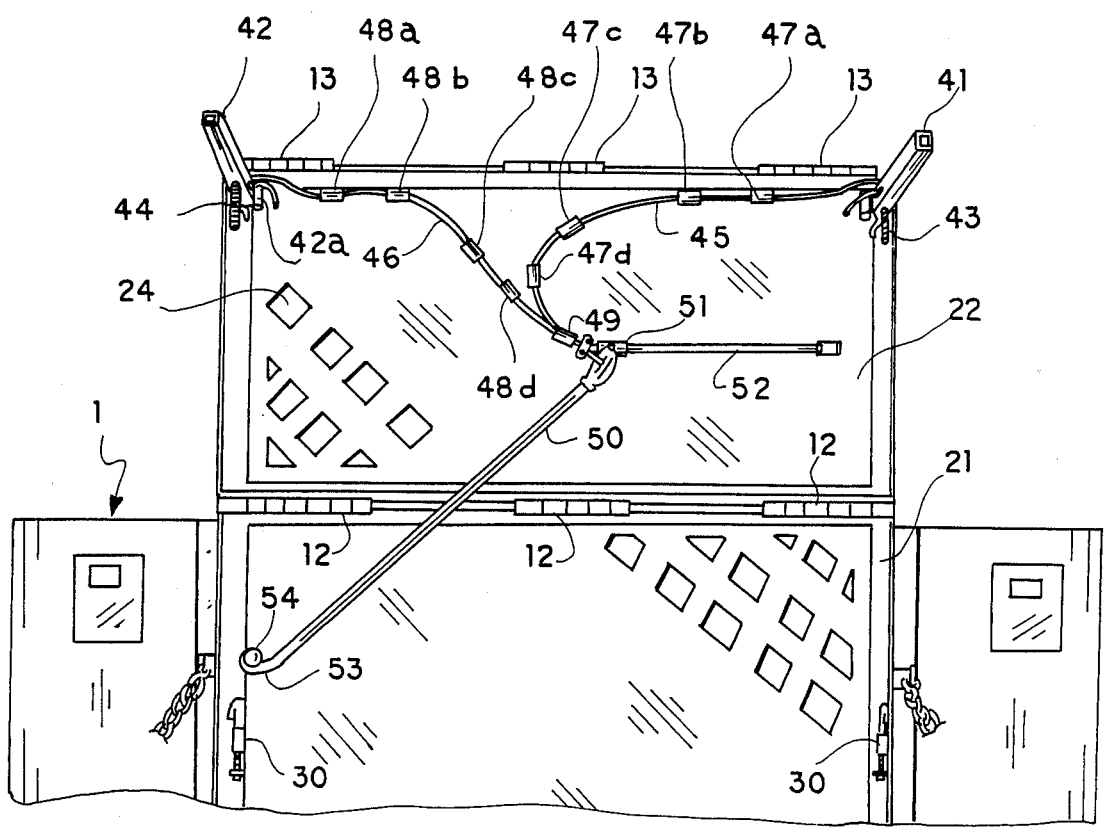
FIG. 4 is an elevational view of the underside of the folding ramp showing the leg retraction mechanism.
Figure 5:
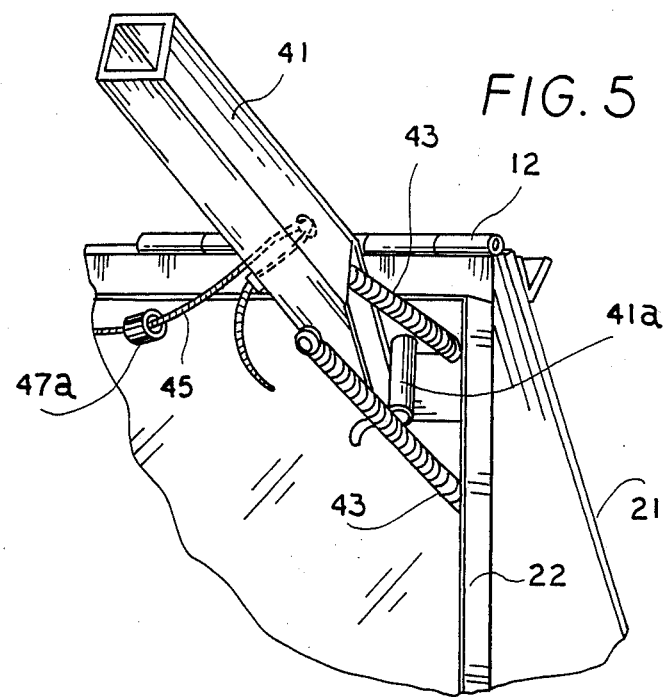
FIG. 5 is a perspective view showing the legs partially retracted.

The ramp 10 has a special mechanism designed to automatically open up or fold in the legs 41, 42. Legs 41, 42 are mounted by hinges 41a, 42a to pivot inward in relation to plate 22. Springs 43, 44 connected between the legs 41, 42 and the edge of plate 22 bias the legs 41, 42 to an open position. Connected to each leg is a cable 45, 46 that runs through the annular guides 47, 48 (a-d) and 49 as shown by FIG. 4. The cables 45, 46 are ultimately connected to the end of a shaft 50. This shaft 50 is pivotably attached to the collar 51 that slides along a second shaft or rod 52. The other end of the shaft 50 is pivotably mounted to the plate 21 by a ring 53 surrounding a post 54.

Folding plates 21 and 22 together, as shown in FIG. 4, forces the shaft 50 and the collar 51, to slide along the shaft 52. Cables 45, 46 are pulled along by the collar 51, thus pulling in the legs 41, 42 against the force of the springs 43, 44. With this mechanism the user of the ramp 10 does not have to pull each leg 41, 42 out to set up the ramp 10, but can extend the ramp for use in one motion.

The construction of the folding ramp 10 can be done using common welding and brazing techniques such as when attaching the cable guides 47, 48 and 49 to the bottom of the plates 21, 22, 23. The flanges 21a, 22a, 23a, rod 52 and latch tubes 32, 33 can also be attached by welding.

It is to be understood that the present invention is not limited to the sole embodiment described above, but encompasses any and all embodiments within the scope of the following claims.

I claim:
1. A folding ramp for vehicles including:
a first plate having a top and bottom pivotably attached to a vehicle;
a second plate having a top and bottom pivotably attached to said first plate;
a third plate having a top and bottom pivotably attached to said second plate;
a plurality of legs pivotably attached to and extending away from said bottom of said second plate;
said legs biased by springs to extend out from said bottom of said second plate;
cable means connecting each leg to one end of a pivoting means; and
said one end of said pivoting means slidably engaged to said bottom of said second plate, said pivoting means having an opposite end pivotably attached to said bottom of said first plate;
whereby unfolding of said first and second plates extends said legs, and folding together said first and second plates causes said legs to retract.

2. The folding ramp according to claim 1, wherein:
said pivoting means comprises an elongated shaft;
said one end of said pivoting means comprises a tubular collar pivotably attached to said elongated shaft;
said collar is freely and slidably disposed around an elongated raod attached to said bottom of said second plate.

3. The folding ramp according to claim 2, further comprising:
a plurality of cable guides disposed across said bottom of said second plate, said cables disposed through said cable guides from said legs to said pivoting means.

4. The folding ramp according to claim 1, including:
latch means to hold said first, second and third plates in a folded position.

5. The folding ramp according to claim 4, wherein said latch means includes:
first and second hollow tubular guides disposed parallel on adjacent edges of said first and third plates when said ramp is folded;
generally U-shaped bolt member having opposite ends disposable into said tubular guides; and
spring means to bias said U-shaped bolt member into said first and second tubular guides, said spring means being compressible to remove said U-shaped member from said tubular guides.

6. The folding ramp according to claim 1, including:
an elongated channel disposed beneath the point at which said first plate is pivotably attached to said vehicle, said channel comprising two elongated flanges disposed normal to each other and attached to each other along a common elongated edge.

7. The folding ramp according to claim 1, including:
one or more continuous flanges disposed on and noramal to said bottoms of said plates, said flanges on said respective plates abut when said folding ramp is extended thus limiting the extension of said folding ramp.

* * * * *